US006547871B2

(12) United States Patent
Chatterji et al.

(10) Patent No.: US 6,547,871 B2
(45) Date of Patent: Apr. 15, 2003

(54) FOAMED WELL CEMENT SLURRIES, ADDITIVES AND METHODS

(75) Inventors: Jiten Chatterji, Duncan, OK (US); Roger S. Cromwell, Walters, OK (US); Chad R. Brenneis, Marlow, OK (US); Bobby J. King, Duncan, OK (US); Dennis W. Gray, Comanche, OK (US); Frank Zamora, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/026,040

(22) Filed: Dec. 20, 2001

(65) Prior Publication Data

US 2002/0096090 A1 Jul. 25, 2002

Related U.S. Application Data

(62) Division of application No. 09/696,902, filed on Oct. 25, 2000, now Pat. No. 6,367,550.

(51) Int. Cl.$^7$ ................................................ C04B 24/00
(52) U.S. Cl. ........................ 106/672; 106/677; 106/724; 106/820
(58) Field of Search ................................ 106/672, 677, 106/724, 820

(56) References Cited

U.S. PATENT DOCUMENTS

| | | | |
|---|---|---|---|
| 2,207,336 A | 7/1940 | Yanick | 106/28 |
| 2,584,123 A | 2/1952 | Gruenwald | 106/142 |
| 3,926,650 A | 12/1975 | Lange et al. | 106/90 |
| 4,020,903 A | 5/1977 | Fielding et al. | 169/47 |
| 4,166,751 A | 9/1979 | Komeiji et al. | 106/112 |
| 4,439,328 A | 3/1984 | Moity | 252/8.5 LC |
| 4,871,395 A | 10/1989 | Sugama | 106/88 |
| 5,047,085 A | 9/1991 | Hihara et al. | 106/677 |
| 5,087,287 A | 2/1992 | Hihara et al. | 106/677 |
| 5,091,014 A | 2/1992 | Hihara et al. | 106/677 |
| 5,133,409 A | 7/1992 | Bour et al. | 166/293 |
| 5,147,565 A | 9/1992 | Bour et al. | 252/8.551 |
| 5,496,479 A | 3/1996 | Videau et al. | 252/49.3 |
| 5,569,324 A | 10/1996 | Totten et al. | 106/696 |
| 5,580,378 A | 12/1996 | Shulman | 106/677 |
| 5,588,489 A | 12/1996 | Chatterji et al. | 166/293 |
| 5,627,143 A | 5/1997 | Swadon | 507/103 |
| 5,696,059 A | 12/1997 | Onan et al. | 507/269 |
| 5,711,801 A | 1/1998 | Chatterji et al. | 106/789 |
| 5,853,050 A | 12/1998 | Kittle | 169/47 |
| 5,897,699 A | 4/1999 | Chatterji et al. | 106/678 |
| 6,063,738 A | 5/2000 | Chatterji et al. | 507/269 |
| 6,085,844 A | 7/2000 | Palmer et al. | 166/312 |

FOREIGN PATENT DOCUMENTS

| | | | |
|---|---|---|---|
| EP | 496682 | * | 7/1952 |
| FR | 2255268 | * | 7/1975 |
| JP | 48014409 | * | 5/1973 |
| JP | 05015761 | * | 1/1993 |
| JP | 06009255 | * | 1/1994 |

OTHER PUBLICATIONS

"Size & Structure of losses of Gypsum mortar in gypsum coating" Krustev Tekh. Misul (1987) 24(3), 77–82, 1987.*
"Effectiveness of retarders and their effect on the basic props. of special gypsums" Kuza Cem.–Wapno.–Gips (4), 68–72, 1989.*
"Physical Props. of gypsum–cement plastic pastes" Ostrowski Cem. Wapno–Gips (1992), 45(6), pp. 199–208, 1992.*
Article entitled "Foamed cement solves producing, injection problems", By Creel et al., Jan. 12, 1998, Oil & Gas Journal, pp. 41–45.

* cited by examiner

Primary Examiner—Paul Marcantoni
(74) Attorney, Agent, or Firm—Craig W. Roddy; C. Clark Dougherty, Jr.

(57) ABSTRACT

The present invention provides improved foamed well cement slurries, additives and methods. The foamed well cement slurries are basically comprised of a hydraulic cement, sufficient water to form a pumpable slurry, sufficient gas to form a foam and an effective amount of an additive for foaming the slurry comprised of hydrolyzed keratin.

13 Claims, No Drawings

FOAMED WELL CEMENT SLURRIES, ADDITIVES AND METHODS

RELATED U.S. APPLICATION DATA

This application is a divisional of application Ser. No. 09/696,902, filed on Oct. 25, 2000 now U.S. Pat. No. 6,367,550.

BACKGROUND OF THE INVENTION

1. Field of the Invention

The present invention relates to foamed well cement slurries, additives for foaming the cement slurries and methods of using the slurries.

2. Description of the Prior Art

Hydraulic cement slurries are commonly utilized in subterranean well completion and remedial operations. For example, hydraulic cement slurries are used in primary cementing operations whereby strings of pipe such as casings and liners are cemented in well bores. In performing primary cementing, a hydraulic cement slurry is pumped into the annular space between the walls of a well bore and the exterior surfaces of a pipe string disposed therein. The cement slurry is permitted to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented.

In carrying out primary cementing as well as remedial cementing operations in well bores, the cement slurries utilized must often be light weight to prevent excessive hydrostatic pressure from being exerted on subterranean formations penetrated by the well bore. As a result, a variety of light weight cement slurries have heretofore been developed and used including foamed cement slurries.

In addition to being light weight, a foamed cement slurry contains compressed gas which improves the ability of the slurry to maintain pressure and prevent the flow of formation fluids into and through the slurry during its transition time, i.e., the time during which the cement slurry changes from a true fluid to a hard set mass. Foamed cement slurries are also advantageous because they have low fluid loss properties.

While foamed cement slurries have included various surfactants known as foaming and foam stabilizing agents or additives for facilitating the foaming and stabilizing of cement slurries when a gas is mixed therewith, the heretofore used foaming and stabilizing additives have not met complete environmental requirements. That is, when the foaming and stabilizing additives find their way into water in the environment, they do not fully degrade which can result in interference with aquatic life cycles.

Thus, there are needs for improved foamed well cement slurries, improved cement slurry foaming and stabilizing additives which degrade completely in the environment and are totally harmless thereto and improved methods of utilizing the foamed well cement slurries.

SUMMARY OF THE INVENTION

The present invention provides improved foamed well cement slurries, improved foaming additives for foaming and stabilizing the cement slurries which are totally harmless to the environment and methods of using the improved foamed well cement slurries which meet the needs described above and overcome the deficiencies of the prior art. The improved foamed cement slurries are basically comprised of a hydraulic cement, sufficient water to form a pumpable slurry, sufficient gas to form a foam and an effective amount of an environment harmless additive for foaming and stabilizing the slurry comprised of hydrolyzed keratin.

The cement slurry foaming and stabilizing additive which is harmless to the environment is keratin which has been base hydrolyzed to form a protein powder. The additive is preferably pre-dissolved in water to form an aqueous solution which is added to the cement slurry along with a gas for foaming the slurry.

The methods of the present invention comprise the steps of forming a foamed cement slurry of the present invention comprised of hydraulic cement, sufficient water to form a pumpable slurry, sufficient gas to form a foam and an effective amount of the above described environmentally safe additive for foaming and stabilizing the cement slurry, placing the foamed cement slurry into a subterranean zone by way of a well bore penetrating the zone and then allowing the foamed cement slurry to set into a hard impermeable mass therein.

It is, therefore, a general object of the present invention to provide improved foamed well cement slurries, additives and methods.

Other and further objects, features and advantages of the present invention will be readily apparent to those skilled in the art upon a reading of the description of preferred embodiments which follows.

DESCRIPTION OF PREFERRED EMBODIMENTS

The improved foamed cement slurries of this invention are useful for performing a variety of completion and remedial procedures in subterranean formations. The foamed cement slurries are basically comprised of a hydraulic cement, sufficient water to form a pumpable slurry, sufficient gas to form a foam and an effective amount of the improved foaming additive of this invention for foaming and stabilizing the slurry comprised of hydrolyzed keratin.

A variety of hydraulic cements can be utilized in accordance with the present invention including those comprised of calcium, aluminum, silicon, oxygen and/or sulphur which set and harden by reaction with water. Such hydraulic cements include Portland cements, pozzolana cements, gypsum cements, high aluminum content cements, silica cements, high alkalinity cements and slag cements. The cements can be of conventional particle sizes or they can be of ultra-fine particle sizes. Portland cements are generally preferred for use in accordance with this invention. Portland cements of the types defined and described in *API Specification For Materials And Testing For Well Cements,* API Specification 10, 5$^{th}$ Edition, dated Jul. 1, 1990 of the American Petroleum Institute are particularly suitable. Preferred such API Portland cements include classes A, B, C, G and H, with API classes G and H being more preferred and class G being the most preferred.

The water in a foamed cement slurry of this invention can be fresh water or saltwater. The term "saltwater" is used herein to mean unsaturated salt solutions and saturated salt solutions including brines and seawater. The water is present in the cement slurry in an amount sufficient to form a pumpable slurry, generally an amount in the range of from about 38% to about 56% by weight of cement in the slurry.

The gas utilized for forming a foamed cement slurry of this invention can be air or nitrogen, with nitrogen being preferred. The gas is present in an amount sufficient to foam the cement slurry, generally in an amount in the range of from about 10% to about 40% by volume of the cement slurries.

Keratin[1] is the structural protein of epithellal cells in the outermost layers of skin. Hydrolyzed keratin is manufactured by the base hydrolysis of hoof and horn meal. That is, the hoof and horn meal is heated with lime in an autoclave to produce a hydrolyzed protein. The amino acid content, i.e., the number of gram molecules of amino acid per 1000 grams of protein, is as follows: Lysine-6.2; Histidine-19.7; Arginine-56.9; Aspartic Acid[2]-51.5; Threonine-55.9; Serine-79.5; Glutamic acid[2]-99; Proline-58.3; Glycine-78; Alanine-43.8; Half cystine-105; Valine-46.6; Methionine-4; Isoleucine-29; Leucine-59.9; Tryosine-28.7; Phenylalanine-22.4; Hydroxyproline-12.2; Hydroxylsine-1.2; Total-863; Average residual weight-117. The protein is commercially available as a free flowing powder that contains about 85% protein. The non-protein portion of the powder consists of about 0.58% insoluble material with the remainder being soluble non-protein materials primarily made up of calcium sulfate, magnesium sulfate and potassium sulfate.

[1] Excerpted from the Encyclopedia Britannica
[2] The values of aspartic and glutamic acid include aspargine and glutamine, respectively.

The hydrolyzed keratin protein powder is preferably predissolved in fresh water in an amount of about 50% by weight of the solution. In addition to water for dissolving the hydrolyzed keratin, the additive can include other components such as one or more freezing and pour point depressants to prevent it from freezing during storage or handling in cold weather and lower its pour point. Preferably, such depressants are selected from the group of propylene glycol, sodium chloride and mixtures thereof. The depressant or depressants utilized are generally present in the additive solution in an amount in the range of from about 1% to about 5% by weight of the solution.

The hydrolyzed keratin is preferably included in a foamed cement slurry of this invention in an amount in the range of from about 1% to about 5% by volume of the water in the foamed cement slurry (from about 2% to about 10% of a 50% by weight solution of the hydrolyzed keratin).

The foamed cement slurries of this invention may be prepared in accordance with any of the mixing techniques utilized in the art. In one preferred method, a quantity of water is introduced into a cement blender followed by the hydraulic cement utilized. The mixture is agitated for a sufficient period of time to form a pumpable non-foamed slurry. The slurry is then pumped to the well bore, and the additive solution of this invention for foaming the slurry followed by the gas utilized are injected into the slurry on the fly. As the slurry and gas flow through the well bore to the location where the resulting foamed cement composition is to be placed, the slurry is foamed. Other liquid additives utilized, if any, are added to the water prior to when the hydraulic cement is mixed therewith and other dry solids, if any, are added to the water and cement prior to mixing.

The methods of this invention of cementing a subterranean zone penetrated by a well bore basically comprise the steps of forming a foamed cement slurry of this invention, pumping the foamed cement slurry into the subterranean zone to be cemented by way of the well bore and then allowing the foamed cement slurry to set into a hard impermeable mass therein.

In order to further illustrate the improved cement slurries, additives and methods of this invention, the following examples are given.

EXAMPLE 1

Test samples of foamed cement slurries of this invention comprised of Portland Class G cement, fresh water or saltwater and air were prepared. For each test sample, an unfoamed cement slurry was first prepared utilizing a mixing device. Predetermined amounts of the resulting slurry were then placed in fixed volume blender jars adapted for receiving a stacked blade assembly. The additive of this invention for foaming and stabilizing a cement composition was added to some of the test samples and three prior art additives consisting of mixtures of foaming agents and foam stabilizers were added to the other samples. The foaming and stabilizing additive of the present invention used in the tests consisted of a 50% by weight aqueous solution of hydrolyzed keratin.

The first prior art additive designated as "Prior Art Additive A" is described in detail in U.S. Pat. No. 6,063,738 issued to Chatterji et al. on May 16, 2000 and consisted of 63.3 parts by weight of an ethoxylated alcohol ether sulfate surfactant, 31.7 parts by weight of cocoylamidopropyl betaine surfactant and 5 parts by weight of cocoylamidopropyl dimethyl amine oxide surfactant. The second prior art additive designated as "Prior Art Mixture B" is described in detail in U.S. Pat. No. 5,897,699 issued to Chatterji et al. on Apr. 27, 1999 and consisted of a mixture of 2 parts by weight of an alpha-olefin sulfonate surfactant and 1 part by weight of cocoylamidopropyl betaine surfactant. The third prior art additive designated as "Prior Art Mixture C" consisted of a mixture of 2 parts by weight of an ethoxylated alcohol ether sulfate surfactant and 1 part by weight of cocoylamidopropyl betaine surfactant. After the addition of the additive of this invention and the prior art additives to the test samples in the jars, the contents were mixed at high speed. The high speed mixing by the stacked blade assembly caused each slurry to be foamed with air. The densities of the non-foamed cement slurries, the densities of the foamed cement slurries, the quantities of foaming additives combined with the cement slurries in order to obtain stable foams in 10 seconds or less and the quantities of salt (sodium chloride) added to the water used to form the cement slurries are set forth in Table I below.

The foamed test samples were allowed to set for 24 hours at 140° F. and atmospheric pressure after which they were subjected to compressive strength and thickening time tests conducted in accordance with the procedures set forth in the API Specification 10 mentioned above. The results of the tests are also set forth in Table I below.

TABLE I

Foamed Portland Cement Slurries Formed With Various Foaming Additives

| Slurry No. | Surfactant Mixture Used | Unfoamed Cement Slurry Density, lb/gal | Foamed Cement Slurry Density, lb/gal | Quantity of 50% Foaming Additive Solution Used, % by vol. of water | Maximum Time Required to Form a Stable Foam, sec | Quantity of Sodium Chloride in Water, % of wt. of water | 24 Hour Compressive Strength at 140° F., psi | Thickening Time at 140° F., hr:min |
|---|---|---|---|---|---|---|---|---|
| 1 | Present Invention | 15.92 | 11.2 | 2.5 | 10 | 0 | 1029 | 7:00 |
| 2 | Present Invention | 16.07 | 11.2 | 2.5 | 10 | 5 | 1276 | — |
| 3 | Present Invention | 16.31 | 11.2 | 2.5 | 10 | 10 | 1210 | — |

TABLE I-continued

Foamed Portland Cement Slurries Formed With Various Foaming Additives

| Slurry No. | Surfactant Mixture Used | Unfoamed Cement Slurry Density, lb/gal | Foamed Cement Slurry Density, lb/gal | Quantity of 50% Foaming Additive Solution Used, % by vol. of water | Maximum Time Required to Form a Stable Foam, sec | Quantity of Sodium Chloride in Water, % of wt. of water | 24 Hour Compressive Strength at 140° F., psi | Thickening Time at 140° F., hr:min |
|---|---|---|---|---|---|---|---|---|
| 4 | Present Invention | 16.7 | 11.2 | 2.5 | 10 | 18 | 1038 | — |
| 5 | Present Invention | 17.62 | 11.2 | 2.5 | 10 | 37 | 380 | 20:00 |
| 6 | Prior Art Mixture A[1] | 15.8 | 11.2 | 2 | 10 | 0 | 1103 | 3:05 |
| 7 | Prior Art Mixture A[1] | 15.95 | 11 | 2 | 10 | 5 | 900 | — |
| 8 | Prior Art Mixture A[1] | 16.2 | 11 | 2 | 10 | 10 | 1220 | — |
| 9 | Prior Art Mixture A[1] | 16.59 | 11.5 | 2 | 10 | 18 | 1013 | — |
| 10 | Prior Art Mixture A[1] | 17.51 | 11.2 | 2 | 10 | 37 | 625 | 5:45 |
| 11 | Prior Art Mixture B[2] | 15.8 | 11.2 | 2.5 | 10 | 0 | 505 | 3:00 |
| 12 | Prior Art Mixture B[2] | 15.95 | 11 | 2.5 | 10 | 5 | 710 | — |
| 13 | Prior Art Mixture B[2] | 16.2 | 11 | 2.5 | 10 | 10 | 725 | — |
| 14 | Prior Art Mixture B[2] | 16.59 | 11.5 | 2.5 | 10 | 18 | 780 | 3:15 |
| 15 | Prior Art Mixture B[2] | 17.51 | 11.2 | 2.5 | 10 | 37 | 460 | — |
| 16 | Prior Art Mixture C[3] | 15.8 | 11.2 | 2.5 | 10 | 0 | 759 | 2:45 |
| 17 | Prior Art Mixture C[3] | 15.95 | 11 | 2.5 | 10 | 5 | 1328 | — |
| 18 | Prior Art Mixture C[3] | 16.2 | 11 | 2.5 | 10 | 10 | 1123 | 2:45 |
| 19 | Prior Art Mixture C[3] | 16.59 | 11.5 | 2.5 | 10 | 18 | 1081 | 3:30 |
| 20 | Prior Art Mixture C[3] | 17.51 | 11.2 | 2.5 | 10 | 37 | 581 | 6:15 |

[1] 63.3 parts by weight ethoxylated alcohol ether sulfate, 31.7 parts by weight cocoylamidopropyl betaine and 5 parts of weight cocoylamidopropyl dimethyl amine oxide
[2] 2 parts by weight alpha-olefin sulfonate and 1 part by weight cocoylamidopropyl betaine
[3] 2 parts by weight ethoxylated hexanol ether sulfate and 1 part by weight cocoylamidopropyl betaine From Table I it can be seen that the foaming additive of the present invention produced stable foamed cement slurries in 10 seconds or less. It is generally accepted that if a foaming and stabilizing additive requires more than 10 seconds in the laboratory to generate a stable foam, the additive is not acceptable in field operations. Further, the compressive strengths of the set foamed cement slurries utilizing the additive of the present invention were generally as good or better than the compressive strengths of the set foamed cement slurries containing the prior art additives. Also, the presence of salt in the cement slurry mixing water does not affect the performance of the foaming additive of the present invention.

EXAMPLE 2

The procedure described in Example 1 was repeated except that instead of standard particle size Portland cement, an ultra-fine particle size Portland cement was utilized. The ultra-fine particle size cement which was used is commercially available from Halliburton Energy Services of Duncan, Oklahoma under the trade designation "MICRO MATRIX™" and it has an average particle size of about 7.5 microns. The results of these tests are given in Table II below.

TABLE II

Foamed Ultra-Fine Cement Slurries Formed With Various Foaming Additives

| Slurry No. | Surfactant Mixture Used | Unfoamed Cement Slurry Density, lb/gal | Foamed Cement Slurry Density, lb/gal | Quantity of 50% Foaming Additive Solution Used, % by vol. of water | Maximum Time Required to Form a Stable Foam, sec | Quantity of Sodium Chloride in Water, % of wt. of water | 24 Hour Compressive Strength at 140° F., psi | Thickening Time at 140° F., hr:min |
|---|---|---|---|---|---|---|---|---|
| 21 | Present Invention | 12.03 | 10 | 2.5 | 10 | 0 | 475 | 1:40 |
| 22 | Present Invention | 12.26 | 10 | 2.5 | 10 | 5 | 678 | — |
| 23 | Present Invention | 12.58 | 10 | 2.5 | 10 | 10 | 782 | — |
| 24 | Present Invention | 13.09 | 10 | 2.5 | 10 | 18 | 631 | 3:25 |
| 25 | Present Invention | 14.32 | 10 | 2.5 | 10 | 37 | 423 | — |
| 26 | Prior Art Mixture A[1] | 12.03 | 10 | 1 | 10 | 0 | 835 | 1:00 |
| 27 | Prior Art Mixture A[1] | 12.26 | 10 | 1 | 10 | 5 | 830 | — |
| 28 | Prior Art Mixture A[1] | 12.58 | 10 | 1 | 10 | 10 | 820 | — |
| 29 | Prior Art Mixture A[1] | 13.09 | 10 | 1.5 | 10 | 18 | 720 | 0:50 |
| 30 | Prior Art Mixture A[1] | 14.32 | 10 | 2.5 | 10 | 37 | 619 | — |
| 31 | Prior Art Mixture B[2] | 12.03 | 10 | 2.5 | 10 | 0 | 467 | 1:00 |
| 32 | Prior Art Mixture B[2] | 12.26 | 10 | 2.5 | 10 | 5 | 312 | — |
| 33 | Prior Art Mixture B[2] | 12.58 | 10 | 2.5 | 10 | 10 | 819 | — |
| 34 | Prior Art Mixture B[2] | 13.09 | 10 | 2.5 | 10 | 18 | 634 | — |
| 35 | Prior Art Mixture B[2] | 14.32 | 10 | 2.5 | 20 | 37 | 564 | 0.45 |
| 36 | Prior Art Mixture C[3] | 12.03 | 10 | 2.5 | 10 | 0 | 795 | 1:00 |

TABLE II-continued

Foamed Ultra-Fine Cement Slurries Formed With Various Foaming Additives

| Slurry No. | Surfactant Mixture Used | Unfoamed Cement Slurry Density, lb/gal | Foamed Cement Slurry Density, lb/gal | Quantity of 50% Foaming Additive Solution Used, % by vol. of water | Maximum Time Required to Form a Stable Foam, sec | Quantity of Sodium Chloride in Water, % of wt. of water | 24 Hour Compressive Strength at 140° F., psi | Thickening Time at 140° F., hr:min |
|---|---|---|---|---|---|---|---|---|
| 37 | Prior Art Mixture C[3] | 12.26 | 10 | 2.5 | 10 | 5 | 946 | — |
| 38 | Prior Art Mixture C[3] | 12.58 | 10 | 2.5 | 10 | 10 | 875 | 0;43 |
| 39 | Prior Art Mixture C[3] | 13.09 | 10 | 2.5 | 10 | 18 | 852 | — |
| 40 | Prior Art Mixture C[3] | 14.32 | 10 | 2.5 | 15 | 37 | 839 | 0:48 |

[1]63.3 parts by weight ethoxylated alcohol ether sulfate, 31.7 parts by weight cocoylamidopropyl betaine and 5 parts of weight cocoylamidopropyl dimethyl amine oxide
[2]2 parts by weight alpha-olefin sulfonate and 1 part by weight cocoylamidopropyl betaine
[3]2 parts by weight ethoxylated hexanol ether sulfate and 1 part by weight cocoylamidopropyl betaine From Table II it can be seen that the surfactant mixture of the present invention produced stable foamed cement slurries in 10 seconds or less. In addition, the presence of salt in the cement slurry mixing water does not affect the performance of the surfactant mixture of the present invention.

EXAMPLE 3

The tests and procedures described in Example 1 above were repeated except that slag cement was substituted for Portland cement. The results of these tests are set forth in Table III below.

EXAMPLE 4

The tests and procedures described in Example 1 above were repeated except that the foaming additives were added to a special low temperature cement slurry comprised of standard particle size Portland Class A cement mixed with the ultra-fine particle size Portland cement described in Example 2 above in an amount of 18% ultra-fine cement by weight of the cement mixture, calcium chloride in an amount of 2% by weight of the cement mixture, a dry cement free flow additive present in an amount of 0.055% by weight of the cement mixture and seawater in amounts sufficient to

TABLE III

Foamed Slag Cement Slurries Formed With Various Foaming Additives

| Slurry No. | Surfactant Mixture Used | Unfoamed Cement Slurry Density, lb/gal | Foamed Cement Slurry Density, lb/gal | Quantity of 50% Foaming Additive Solution Used, % by vol. of water | Maximum Time Required to Form a Stable Foam, sec | Quantity of Sodium Chloride in Water, % of wt. of water | 24 Hour Compressive Strength at 140° F., psi | Thickening Time at 140° F., hr:min |
|---|---|---|---|---|---|---|---|---|
| 41 | Present Invention | 15.03 | 12 | 5 | 10 | 0 | 1239 | 4:30 |
| 42 | Present Invention | 15.18 | 12 | 5 | 10 | 5 | 1549 | — |
| 43 | Present Invention | 15.42 | 12 | 5 | 10 | 10 | 1554 | — |
| 44 | Present Invention | 15.8 | 12 | 5 | 10 | 18 | 1096 | 3:25 |
| 45 | Present Invention | 16.71 | 12 | 3 | 10 | 37 | 1008 | 1:50 |
| 46 | Prior Art Mixture A[1] | 15.03 | 12 | 2 | 10 | 0 | 2250 | 1:20 |
| 47 | Prior Art Mixture A[1] | 15.18 | 12 | 2 | 10 | 5 | — | — |
| 48 | Prior Art Mixture A[1] | 15.42 | 12 | 2 | 10 | 10 | — | — |
| 49 | Prior Art Mixture A[1] | 15.80 | 12 | 2 | 10 | 18 | — | — |
| 50 | Prior Art Mixture A[1] | 16.71 | 12 | 3.5 | 10 | 37 | 1588 | 0:40 |
| 51 | Prior Art Mixture B[2] | 15.03 | 12 | 3.5 | ----------------would not foam---------------- | | | |
| 52 | Prior Art Mixture B[2] | 15.18 | 12 | 3.5 | ----------------would not foam---------------- | | | |
| 53 | Prior Art Mixture B[2] | 15.42 | 12 | 3.5 | ----------------would not foam---------------- | | | |
| 54 | Prior Art Mixture B[2] | 15.80 | 12 | 3.5 | ----------------would not foam---------------- | | | |
| 55 | Prior Art Mixture B[2] | 16.71 | 12 | 3.5 | ----------------would not foam---------------- | | | |
| 56 | Prior Art Mixture C[3] | 15.03 | 12 | 3.5 | 10 | 0 | 1715 | 1:15 |
| 57 | Prior Art Mixture C[3] | 15.18 | 12 | 3.5 | 10 | 5 | 2340 | — |
| 58 | Prior Art Mixture C[3] | 15.42 | 12 | 3.5 | 10 | 10 | 1597 | — |
| 59 | Prior Art Mixture C[3] | 15.80 | 12 | 3.5 | 20 | 18 | 1692 | — |
| 60 | Prior Art Mixture C[3] | 16.71 | 12 | 3.5 | 30 | 37 | 1338 | 0:37 |

[1]63.3 parts by weight ethoxylated alcohol ether sulfate, 31.7 parts by weight cocoylamidopropyl betaine and 5 parts of weight cocoylamidopropyl dimethyl amine oxide
[2]2 parts by weight alpha-olefin sulfonate and 1 part by weight cocoylamidopropyl betaine
[3]2 parts by weight ethoxylated hexanol ether sulfate and 1 part by weight cocoylamidopropyl betaine From Table III it can again be seen that the surfactant mixture of the present invention produced stable foams in 10 seconds or less.

form cement slurries having the densities set forth in Table IV below. The results of the tests are also set forth in Table IV below.

TABLE IV

Foamed Low Temperature Cement Slurries With Various Surfactant Mixtures

| Slurry No. | Surfactant Mixture Used | Unfoamed Cement Slurry Density, lb/gal | Foamed Cement Slurry Density, lb/gal | Quantity of 50% Foaming Additive Solution Used, % by vol. of water | Maximum Time Required to Form a Stable Foam, sec | 24 Hour Compressive Strength at 45° F., psi | Thickening Time at 65° F., hr:min |
|---|---|---|---|---|---|---|---|
| 61 | Present Invention | 15.3 | 12 | 2.5 | 10 | 707 | 0 |
| 62 | Prior Art Mixture A[1] | 15.24 | 12 | 1 | 10 | 381 | 4:00 |
| 63 | Prior Art Mixture B[2] | 15.17 | 12 | 1 | 10 | 345 | 2:45 |
| 64 | Prior Art Mixture C[3] | 15.17 | 12 | 2.25 | 10 | 348 | 4:03 |

[1]63.3 parts by weight ethoxylated alcohol ether sulfate, 31.7 parts by weight cocoylamidopropyl betaine and 5 parts by weight cocoylamidopropyl dimethyl amine oxide
[2]2 parts by weight alpha-olefin sulfonate and 1 part by weight cocoylamidopropyl betaine
[3]2 parts by weight ethoxylated hexanol ether sulfate and 1 part by weight cocoylamidopropyl betaine From Table IV it can again be seen that the foaming additive of the present invention produces stable foamed cement slurries having good compressive strengths at low temperatures.

EXAMPLE 5

A number of the foamed cement slurries formed in accordance with the procedure set forth in Example 1 were tested for Theological properties in accordance with the procedures set forth in the above mentioned API Specification 10. The results of these tests are set forth in Table V below.

From Table V it can be seen that the foamed cement slurries containing the foaming additive of the present invention have low apparent viscosities which indicates that the placement of such foamed cement slurries in subterranean formations will not result in formation breakdown due to high pumping pressures exerted thereon.

EXAMPLE 6

Three different test cement slurries were prepared which included the foaming additive of this invention. The various components and amounts included in the cement slurries are set forth in Table VI below.

TABLE V

Rheological Properties Of Foamed Cement Slurries

| Slurry No. | Surfactant Mixture Used | Viscosity at Room Temperature, cp | | | | | |
|---|---|---|---|---|---|---|---|
| | | 600 rpm | 300 rpm | 200 rpm | 100 rpm | 6 rpm | 3 rpm |
| 1 | Present Invention | 116 | 64 | 49 | 24 | 15 | 11 |
| 5 | Present Invention | 98 | 60 | 46 | 30 | 13 | 11 |
| 6 | Prior Art Mixture A[1] | 118 | 75 | 63 | 50 | 21 | 14 |
| 8 | Prior Art Mixture A[1] | 90 | 54 | 42 | 35 | 18 | 15 |
| 13 | Prior Art Mixture B[2] | 78 | 48 | 36 | 26 | 13 | 12 |
| 15 | Prior Art Mixture B[2] | 78 | 50 | 42 | 32 | 17 | 14 |
| 16 | Prior Art Mixture C[3] | 150 | 88 | 80 | 68 | 24 | 18 |
| 21 | Present Invention | 79 | 38 | 32 | 26 | 17 | 14 |
| 26 | Prior Art Mixture A[1] | 68 | 54 | 48 | 40 | 24 | 20 |
| 28 | Prior Art Mixture A[1] | 75 | 56 | 51 | 40 | 25 | 21 |
| 33 | Prior Art Mixture B[2] | 76 | 44 | 35 | 26 | 14 | 12 |
| 38 | Prior Art Mixture C[3] | 79 | 53 | 42 | 35 | 20 | 16 |
| 41 | Present Invention | 70 | 55 | 48 | 38 | 21 | 16 |
| 48 | Prior Art Mixture A[1] | 69 | 54 | 47 | 38 | 24 | 20 |
| 58 | Prior Art Mixture C[3] | 68 | 55 | 49 | 40 | 25 | 22 |

[1]63.3 parts by weight ethoxylated alcohol ether sulfate, 31.7 parts by weight cocoylamidopropyl betaine and 5 parts of weight cocoylamidopropyl dimethyl amine oxide
[2]2 parts by weight alpha-olefin sulfonate and 1 part by weight cocoylamidopropyl betaine
[3]2 parts by weight ethoxylated hexanol ether sulfate and 1 part by weight cocoylamidopropyl betaine

TABLE VI

Cement Slurry Components And Amounts

| Slurry No. | Hydraulic Cement | Finely Ground Crystalline Silica, % by wt. of cement | Amorphous Silica, % by wt. of cement | High Temperature Anti-Settling Agent[1], % by wt. of cement | Set Retarder[2], % by wt. of cement | Fresh Water, % by wt. of cement | Foaming Additive, % by wt. of water | Slurry Density, lb/gal |
|---|---|---|---|---|---|---|---|---|
| 1 | Portland Class H | 30 | 15 | 0.4 | 1.2 | 52.3 | 2.0[3] | 16.11 |
| 2 | Portland Class H | 30 | 5  | —   | 0.8 | 52.6 | 2.5[4] | 16 |
| 3 | Portland Class H | 30 | —  | —   | 0.8 | 51.3 | 2.5[4] | 16 |

[1]Hydroxypropyl guar substituted with 0.6–0.8 moles of propylene oxide.
[2]A non-dispersing retarder comprised of a mixture Kraft lignosulfonate, xylos and lignosulfonates produced by the bisulfite method.
[3]Two parts by weight ethoxylated hexanol ether sulfate and one part by weight cocoylamidopropyl betaine - U.S. Pat. No. 5,897,699
[4]Foaming additive of the present invention, i.e., hydrolyzed keratin in a 50% by weight fresh water solution.

Test samples of the three test cement slurries described above were tested for thickening time in accordance with the procedure set forth in the above mentioned API Specification 10. The results of these tests are given in Table VII below.

Additional test samples of the three cement slurries described above were foamed with nitrogen to the densities given in Table VII below at 250° F. and 1000 psi. The foamed samples were then cured at 318° F. and 1000 psi for 24 hours. The cured samples were then cut into top, middle and bottom sections and the densities of the samples were determined. The results of these tests are also given in Table VII below.

TABLE VII

Set Foamed Cement Slurry Settling Tests

| Slurry No. | Thickening Time[1], hrs:min | Foamed Slurry Density, lb/gal | Set Foamed Cement Section Density, lb/gal[2] | | | Total Density Variation |
| | | | Top | Middle | Bottom | |
|---|---|---|---|---|---|---|
| 1 | 4:07 | 12.1  | 11.98 | 12.45 | 12.79 | 0.81 |
| 2 | 4:15 | 12.92 | 12.14 | 12.86 | 12.76 | 0.62 |
| 3 | 3:53 | 13.67 | 13.29 | 14.15 | 15.03 | 1.74 |

[1]Thickening time test schedule: 80° F. to 250° F. and 800 psi to 10,000 psi in 1 hour and conditions held until completion of test.
[2]Foamed slurry preparation-curing schedule: slurry foamed with 1000 psi nitrogen pressure, temperature increased from 80° F. to 250° F. (under 1000 psi pressure) in one hour, transferred to curing cells (at 250° F. and under 1000 psi pressure) and cured in oven at 318° F.

From the thickening time tests in Table VII, it can be seen that the foamed cement slurries of this invention will provide the required placement times when a set retarder is included therein. Also, the set foamed cement slurry settling tests show that very little settling took place in the foamed cement slurries of this invention during the time required for the foamed cement slurries to set.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A foamed cement slurry for cementing a well comprising:
   a hydraulic cement;
   sufficient water to form a pumpable slurry;
   sufficient gas to form a foam; and
   an effective amount of an additive for foaming and stabilizing said slurry comprised of hydrolyzed keratin.

2. The foamed cement slurry of claim 1 wherein said hydraulic cement is selected from the group consisting of Portland cements, slag cements, pozzolana cements, gypsum cements, high alumina content cements, silica cements and high alkalinity cements.

3. The foamed cement slurry of claim 1 wherein said water is selected from the group of fresh water and saltwater.

4. The foamed cement slurry of claim 1 wherein said water is present in an amount in the range of from about 38% to about 56% by weight of hydraulic cement therein.

5. The foamed cement slurry of claim 1 wherein said gas is selected from the group of air and nitrogen.

6. The foamed cement slurry of claim 1 wherein said gas is present in an amount in the range of from about 10% to about 40% by volume of said cement slurry.

7. The foamed cement slurry of claim 1 wherein said hydrolyzed keratin is present in said foamed cement slurry in an amount in the range of from about 1% to about 5% by volume of said water in said foamed cement slurry.

8. A foamed cement slurry comprising:
   a hydraulic cement;
   sufficient water to form a pumpable slurry;
   sufficient gas to form a foam; and
   hydrolyzed keratin present in said foamed cement slurry in an amount in the range of from about 1% to about 5% by volume of said water in said foamed cement slurry.

9. The foamed cement slurry of claim 8 wherein said hydraulic cement is selected from the group consisting of Portland cements, slag cements, pozzolana cements, gypsum cements, high alumina content cements, silica cements and high alkalinity cements.

10. The foamed cement slurry of claim 8 wherein said water is selected from the group of fresh water and saltwater.

11. The foamed cement slurry of claim 8 wherein said water is present in an amount in the range of from about 38% to about 56% by weight of hydraulic cement therein.

12. The foamed cement slurry of claim 8 wherein said gas is selected from the group of air and nitrogen.

13. The foamed cement slurry of claim 8 wherein said gas is present in an amount in the range of from about 10% to about 40% by volume of said cement slurry.

* * * * *